(12) United States Patent
Siomina et al.

(10) Patent No.: US 11,190,961 B2
(45) Date of Patent: Nov. 30, 2021

(54) METHODS FOR CONTROLLING RELATIVE MEASUREMENTS IN THE PRESENCE OF LBT

(71) Applicant: Telefonaktiebolaget LM Ericsson (publ), Stockholm (SE)

(72) Inventors: Iana Siomina, Täby (SE); Muhammad Kazmi, Sundbyberg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 132 days.

(21) Appl. No.: 16/089,984

(22) PCT Filed: Mar. 28, 2017

(86) PCT No.: PCT/EP2017/057308
§ 371 (c)(1),
(2) Date: Sep. 28, 2018

(87) PCT Pub. No.: WO2017/167746
PCT Pub. Date: Oct. 5, 2017

(65) Prior Publication Data
US 2019/0132760 A1    May 2, 2019

Related U.S. Application Data

(60) Provisional application No. 62/316,698, filed on Apr. 1, 2016.

(51) Int. Cl.
*H04W 24/10* (2009.01)
*H04W 74/08* (2009.01)
(Continued)

(52) U.S. Cl.
CPC ........... *H04W 24/10* (2013.01); *H04W 24/00* (2013.01); *H04W 74/0808* (2013.01); *H04W 16/14* (2013.01)

(58) Field of Classification Search
None
See application file for complete search history.

(56) References Cited

U.S. PATENT DOCUMENTS

| | | | |
|---|---|---|---|
| 7,245,893 B1 * | 7/2007 | Husted | H03G 3/3068 375/345 |
| 2006/0030267 A1 * | 2/2006 | Bhardwaj | H04B 1/1027 455/63.1 |

(Continued)

FOREIGN PATENT DOCUMENTS

WO        2016039600 A1    3/2016

OTHER PUBLICATIONS

Unknown, Author, "LAA CSI measurements", 3GPP TSG RAN WG1 Meeting #82bis, R1-155476, Malmo, Sweden, Oct. 5-9, 2015, 1-3.

(Continued)

*Primary Examiner* — Andrew C Oh
(74) *Attorney, Agent, or Firm* — Murphy, Bilak & Homiller, PLLC (57) ABSTRACT

In one aspect, a wireless device (50) is configured to perform relative measurements involving radio measurements of transmissions from first and second cells. The wireless device determines that LBT operations performed by a network node (30) for one or both of the first and second cells may affect a measurement component of a relative measurement. The wireless device (50) performs the relative measurement based on the determination. The network node may also determine whether downlink LBT operations performed on the cells impact at least one measurement component of the relative measurement performed by the wireless device. The network node (30) determines configuration (Continued)

parameters related to the relative measurement, based on said determining, and signals the configuration parameters to the wireless device.

26 Claims, 7 Drawing Sheets

(51) Int. Cl.
*H04W 24/00* (2009.01)
*H04W 16/14* (2009.01)

(56) References Cited

U.S. PATENT DOCUMENTS

| | | | |
|---|---|---|---|
| 2011/0039577 A1* | 2/2011 | Stern-Berkowitz | G01S 5/0205 455/456.1 |
| 2015/0280847 A1 | 10/2015 | Somasundaram et al. | |
| 2015/0365152 A1* | 12/2015 | Frenne | H04L 5/005 370/252 |
| 2016/0100433 A1* | 4/2016 | Vajapeyam | H04B 17/336 370/329 |
| 2016/0119951 A1* | 4/2016 | Mallik | H04W 74/0808 370/329 |
| 2016/0149681 A1* | 5/2016 | Vajapeyam | H04W 24/10 370/252 |
| 2016/0262188 A1* | 9/2016 | Zhang | H04W 74/0808 |
| 2016/0360437 A1* | 12/2016 | Larsson | H04L 5/0048 |
| 2017/0111874 A1* | 4/2017 | Harada | H04W 52/143 |
| 2017/0118728 A1* | 4/2017 | Harada | H04W 16/14 |
| 2017/0195889 A1* | 7/2017 | Takeda | H04W 72/0446 |
| 2017/0257889 A1* | 9/2017 | Mukherjee | H04W 76/15 |
| 2017/0272988 A1* | 9/2017 | Hoidis | H04W 36/0085 |
| 2017/0339693 A1* | 11/2017 | Cierny | H04W 24/10 |
| 2017/0347270 A1* | 11/2017 | Iouchi | H04W 72/0406 |
| 2018/0027568 A1* | 1/2018 | Harada | H04W 24/10 370/230 |
| 2018/0063736 A1* | 3/2018 | Sadeghi | H04W 24/10 |
| 2018/0213561 A1* | 7/2018 | Bhorkar | H04W 74/0808 |
| 2018/0279211 A1* | 9/2018 | Lunttila | H04W 72/0453 |
| 2018/0332512 A1* | 11/2018 | Dalsgaard | H04W 36/00837 |
| 2019/0007147 A1* | 1/2019 | Li | H04W 76/27 |
| 2019/0075596 A1* | 3/2019 | Ye | H04L 5/0035 |
| 2020/0288530 A1* | 9/2020 | Wolfner | H04W 48/16 |

OTHER PUBLICATIONS

Unknown, Author, "Required functionality for support of LAA-LTE", Qualcomm Incorporated, 3GPP TSG-RAN WG2 Meeting #89, R2-150517, Athens, Greece, Feb. 9-13, 2015, 1-4.

3GPP, "3rd Generation Partnership Project; Technical Specification Group Radio Access Network; Evolved Universal Terrestrial Radio Access (E-UTRA); Physical channels and modulation (Release 13)", 3GPP TS 36.211 V13.0.0, Dec. 2015, 1-141.

3GPP, "3rd Generation Partnership Project; Technical Specification Group Radio Access Network; Evolved Universal Terrestrial Radio Access (E-UTRA); Physical layer; Measurements (Release 13)", 3GPP TS 36.214 V13.0.0, Dec. 2015, 1-18.

Unknown, Author, "RRM requirements impact with eLAA", Ericsson, 3GPP TSG RAN WG4 Meeting #78bis, R4-162159, San Jose del Cabo, MX, Apr. 11-15, 2016, 1-2.

* cited by examiner

METHODS FOR CONTROLLING RELATIVE MEASUREMENTS IN THE PRESENCE OF LBT

TECHNICAL FIELD

The present invention generally relates to wireless communication networks, and particularly relates to relative measurements in the presence of listen-before-talk (LBT), including a wireless device that performs relative measurements involving radio measurements of transmissions from first and second cells.

BACKGROUND

Long Term Evolution (LTE) specifications have been standardized, by members of the 3$^{rd}$-Generation Partnership Project (3GPP), and support Component Carrier (CC) bandwidths up to 20 MHz, which is the maximum carrier bandwidth under Release 8 of the LTE specifications. LTE operation with wider bandwidth than 20 MHz is possible, using multiple CCs, appearing as a number of LTE carriers to an LTE terminal. A straightforward way to obtain this would be by means of Carrier Aggregation (CA). The LTE standard supports up to 5 aggregated carriers, where each carrier is limited, according to the 3GPP specifications, to have one of six bandwidths, namely 6, 15, 25, 50, 75 or 100 RB (corresponding to 1.4, 3, 5, 10, 15 and 20 MHz respectively). The number of aggregated CCs as well as the bandwidth of the individual CC may be different for uplink and downlink.

During initial access, an LTE CA-capable terminal behaves similarly to a terminal not capable of CA. Upon successful connection to the network, a terminal may, depending on its own capabilities and the network, be configured with additional CCs in the uplink (UL) and downlink (DL). This configuration is based on Resource Radio Control (RRC) signaling. Due to the heavy signaling and rather slow speed of RRC signaling, it is envisioned that a terminal may be configured with multiple CCs, even when not all of them are currently used.

In CA, the terminal (user equipment or UE) is configured with a primary CC (PCC), a primary cell (PCell) or a primary serving cell (PSC). The PCell is particularly important, e.g., due to control signaling on this cell and UE monitoring of the radio quality on the PCell. A CA-capable terminal can, as explained above, also be configured with additional carriers (or cells or serving cells) which are referred to as secondary CCs (SCC), secondary cells (SCell) or secondary serving cells (SSC). Note that the terms SCC, SSC, and SCell may be used interchangeably, as may the terms PCC, PCell, and PSC.

Figure 1:
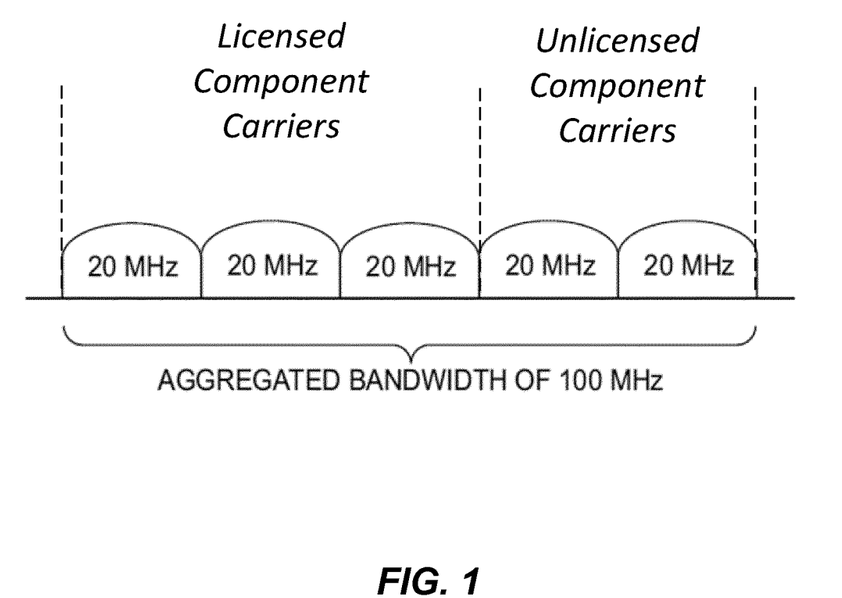
FIG. 1 is a diagram illustrating carrier aggregation with licensed and unlicensed frequency bands.

To further improve the performance of LTE systems, CA has been expanded to enable the use of LTE in an unlicensed spectrum. This operation is referred to as License Assisted Access (LAA). As unlicensed spectrum may never match the qualities of licensed spectrum, the intention with LAA is to apply carrier aggregation and use a secondary carrier in an unlicensed band, while having a primary carrier in a licensed band. This will then ensure that the reliability associated with licensed carriers can be enjoyed for the primary carrier and only secondary carriers are used in unlicensed bands. However, operation of an unlicensed carrier as a standalone operation or CA with a primary carrier in an unlicensed band may also be employed. CA using licensed and unlicensed carriers is shown, for example, in FIG. 1.

LAA, or operation based on frame structure 3 (FS3) (specified in 3GPP TS 36.211), which was introduced in LTE Release 13, refers to UE operation on at least one carrier in unlicensed spectrum such as Band 46, which is also used for Wi-Fi access. For example, a UE can be configured with carrier aggregation with PCell in Band 1 (licensed spectrum) and SCell in Band 46 (unlicensed spectrum). A base station, such as an eNodeB or eNB, operating in the unlicensed band only transmits signals which may be used for UE measurements using so called discovery reference symbols (DRS). DRS may comprise any type of reference signal that can be used by the UE for performing one or more measurements. Examples of DRS are a cell-specific reference signal (CRS), a channel-state information reference signal (CSI-RS), a primary synchronization signal (PSS), a secondary synchronization signal (SSS), a multicast-broadcast single-frequency network reference signal (MBSFN RS), etc. One or more DRS may be transmitted in the same DRS time resource. Examples of DRS time resources are symbols, subframes, slots, etc.

Unlike Release 8 CRS (common reference symbols), DRS is not transmitted in every subframe, and is instead transmitted periodically (e.g., every 160 ms). Moreover, the eNB may perform so called listen before talk (LBT) procedures to check that no other node (such as another eNB or a Wi-Fi access point) is transmitting in the unlicensed spectrum before it transmits DRS. This means that from a UE perspective, the eNB may be unable to transmit any particular DRS transmission. In certain regions, LBT functionality is required from a regulatory point of view to ensure fair coexistence of different radios and access technologies on the unlicensed band.

According to the LBT procedure, the transmitter in unlicensed spectrum (e.g., base station in the case of downlink or the UE in the case of uplink) needs to listen on the carrier before it starts to transmit. If the medium is free, the transmitter can transmit. If the medium is busy, e.g., some other node is transmitting, the transmitter cannot transmit and the transmitter can try again at a later time. Therefore, the LBT procedure enables a clear channel assessment (CCA) check before using the channel. The LBT procedure may also be called a channel carrier sense multiple access (CSMA) scheme, channel assessment scheme, clear channel assessment scheme, etc.

Based on the CCA, if the channel is found to be clear, then LBT is considered to be successful. But if the channel is found to be occupied, then the LBT is considered to have failed (LBT failure). The LBT failure requires the network node to not transmit signals in the same and/or subsequent subframes. The exact subframes and the number of subframes where transmission is forbidden depends on the specific design of an LBT scheme. Due to LBT, a transmission in an unlicensed band may be delayed until the medium becomes free again. In a case where there is no coordination between the transmitting nodes (which often is the case), the delay may appear random.

In the simplest form, LBT is performed periodically with a period equal to certain units of time. As an example, one unit of time duration may be one TTI, one time slot, one subframe, etc. The duration of listening in LBT is typically in the order of a few μsec to tens of μsec. Typically, for LBT purposes, each LTE subframe is divided into two parts: in the first part, the listening takes place and the second part carries data if the channel is seen to be free. The listening occurs at the beginning of the current subframe and determines whether or not data transmission will continue in this subframe and a few next subframes. Hence, the data transmission in a subframe P until subframe P+n is determined by the outcome of listening during the beginning of subframe P. The number n depends on system design and/or regulatory requirements.

In Release 14, uplink operation is being introduced in addition to the existing downlink operation in the unlicensed spectrum. This means that a UE may be configured with uplink transmissions on one or more secondary cells in the unlicensed spectrum and perform uplink LBT if necessary.

As for Dual Connectivity (DC) operation, the UE can be served by at least two nodes called master eNB (MeNB) and secondary eNB (SeNB). More generally, in multiple connectivity (multi-connectivity or MC) operation, the UE can be served by two or more nodes, such as an MeNB, SeNB1, SeNB2 and so on. The UE is configured with a primary component carrier (PCC) from both MeNB and SeNB. The primary cell (PCell) from MeNB and SeNB are called PCell and primary secondary cell (PSCell), respectively. The PCell and PSCell typically operate the UE independently. The UE is also configured with one or more secondary component carriers (SCCs) from each of MeNB and SeNB. The corresponding secondary serving cells served by MeNB and SeNB are called secondary cells (SCells). The UE in DC typically has separate transmission/reception for each of the connections with MeNB and SeNB. This allows the MeNB and SeNB to independently configure each UE with one or more procedures, such as radio link monitoring (RLM), discontinuous reception (DRX) cycle, etc., on its PCell and PSCell, respectively.

Radio measurements are performed by a UE for various purposes, including for use in mobility operations and in positioning operations. Some examples of radio measurements are: received signal strength indicator (RSSI) measurement, channel occupancy measurement, Wi-Fi RSSI measurement, WLAN RSSI measurement, signal strength or signal power measurements (e.g., reference signal received power (RSRP), CSI-reference signal received quality (CSI-RSRQ) or CSI-RSRP), signal quality measurements (e.g., RSRQ, signal-to-interference plus noise ratio (SINR)), timing measurements (e.g., reception-transmission (Rx-Tx), reference signal time difference (RSTD), round trip time (RTT), time of arrival (TOA)), radio link monitoring measurements (RLM), CSI, pre-coding matrix indicator (PMI), cell detection, cell identification, number of successful reports, number of ACKs/NACKs, failure rate, error rate, etc. The measurements may be absolute or relative (e.g., absolute RSRP and relative RSRP). The measurements may be performed for one or more different purposes, e.g., radio resource management (RRM), self-organizing networks (SON), positioning, minimization of drive tests (MDT), etc. The measurements may be, e.g., intra-frequency measurements, inter-frequency measurements, or CA measurements. The measurements may be performed in the licensed and/or unlicensed spectrum. Absolute measurement is done for only one single cell or the measurement is not compared with some reference value. On the other hand, an absolute measurement involves two cells or the measurement done on signals of a cell is not compared with some reference value or reference measurement component. The reference value can be pre-defined or configured by the network node.

A relative measurement refers to a radio measurement comprising a first measurement component and a second measurement component that are compared to obtain the relative measurement. Some examples of relative measurements are relative power measurements such as relative RSRP or relative RSRQ, and relative timing measurements such as reference signal time difference (RSTD) specified in 3GPP TS 36.214. Relative measurements may be intra-frequency, inter-frequency, CA, inter-RAT, etc. Typically, a relative measurement result is obtained by the UE be comparing the measurements done on any two cells. A relative measurement may be, for example, a relative signal strength comparing strengths measured on serving cell and a neighbor cell, comparing transmit and/or receive timings of serving cell or a reference cell with those of a neighbor cell. The relative measurement quantity can be expressed in linear scale or in log scale. In the former case, relative measurement quantity is the difference between the two measurement components and is expressed in dBs.

Current 3GPP relative power measurements are relative RSRP and relative RSRQ, which are used for event triggering. For example, event A3 is an event where a neighbor becomes offset better than PCell, where the cell(s) that triggers the event is on the frequency indicated in the associated measObject, which may be different from the (primary) frequency used by the PCell. Another event is event A6, where a neighbor becomes offset better than SCell, where the neighbor(s) is on the same frequency as the SCell, i.e., both are on the frequency indicated in the associated measObject, and it is therefore important to ensure that the triggering occurs with a sufficient accuracy.

SUMMARY

A relative measurement (e.g., relative RSRP or relative RSRQ) involves two components, at least one of which may be not available when needed, due to downlink LBT. That is, the transmitting base station may not have been able to access the channel and transmit the reference signals that are necessary for the wireless device to measure and incorporate into a relative measurement. It is recognized herein that this may result in relative measurement performance degradation or in relative measurement failure, in the worst case. What makes the problem even more severe is that the LAA measurements are restricted to DRS subframes. If a measurement component is not available due to downlink LBT in one DRS occasion, it may take a long time until the next DRS occasion and, even then, there is no guarantee that the measured signals will not be affected by downlink LBT again. Without downlink LBT, the wireless device can assume that the necessary signals are available. With downlink LBT, on the other hand, the wireless device cannot be certain that the signals for both of the measurement components are available.

To address these problems, various embodiments described herein are directed to how a wireless device performs relative measurements in the presence of LBT. According to some embodiments, a method, in a wireless device, for performing relative measurements involving radio measurements of transmissions from first and second cells includes determining that LBT operations performed by a network node for one or both of the first and second cells may affect a measurement component of a relative measurement. The method also includes performing the relative measurement, wherein said performing is based on this determination.

According to some embodiments, a method in a wireless device for performing relative measurements involving radio measurements of transmissions from first and second cells comprises determining that listen-before-talk, LBT, operations may be performed by a network node for one or both of the first and second cells. The method further comprises performing the relative measurement, wherein said performing is based on said determining.

According to some embodiments, the method optionally further comprises adapting at least one parameter related to the relative measurement based on said determining. The performing the relative measurement is based on said at least one parameter.

According to some embodiments, the at least one parameter is a maximum measurement time.

According to some embodiments, the method further comprises one or more of: reporting the performed relative measurement to another node; performing a handover or other cell change; performing a positioning operation; and adapting a timing maintained by the wireless device.

According to some embodiments, said determining that LBT operations performed by the network node for one or both of the first and second cells may affect a measurement component of a relative measurement comprises determining that a measurement component may be impacted based on one or more of: a carrier on which the measurement component is measured having a given frame structure; information indicating that a measured cell may perform downlink LBT operations; detecting that one or more discovery reference signals, DRSs, are detected as not present in a DRS occasion or in a series of DRS occasions over an interval having a predetermined length; information received from another node that indicates that downlink LBT operations may be performed on the first and/or second cells; information received from another node indicates that the wireless device should adapt the wireless device's relative measurement procedure; and information received from another node indicates at least one parameter related to relative measurement for downlink LBT operations.

According to some embodiments, performing the relative measurement comprises applying one or more parameters and/or conditions specific to relative measurements involving downlink LBT operations.

According to some embodiments, one or more of the following conditions apply to the relative measurement: signals to be measured for each measurement component can be missing no more than a predetermined number N times; signals to be measured for each measurement component can be missing no more than a predetermined number N times during a time interval having a length T1; at least M samples for each measurement component are not impacted by downlink LBT operations; at least M samples for each measurement component are not impacted by downlink LBT operations during a time interval having a length T2; samples of the two measurement components for the first and second cells are not separated in time by more than a predetermined time interval delta_t1; the two measurement components are not separated in time y more than a predetermined time interval delta_t2; no more than K time resources containing signals to be measured for each measurement component can be missing; and no more than K time resources containing signals to be measured for each measurement component can be missing during a time interval having length T3.

According to some embodiments, if the one or more conditions are not met for an ongoing relative measurement, the method comprises one of: discarding the ongoing relative measurement; discarding the ongoing relative measurement and restarting a relative measurement; continuing the ongoing relative measurement with one or more relaxed requirements; and continuing the ongoing relative measurement with an extended measurement time.

According to some embodiments, performing the relative measurement comprises one or more of: adapting a measurement sampling rate and/or a number of measurement samples for at least one measurement component; adapting a measurement time over which the wireless device obtains samples for at least one measurement component; adapting one or more of relative measurement procedures; adapting a combining of the two measurement components; partially discarding a relative measurement; and adapting a measurement time of the relative measurement to account for downlink LBT detection on one or both measurement components.

According to some embodiments, the method further comprises reporting the performed relative measurement to another node, and wherein said reporting comprises indicating whether the wireless device performed the relative measurement according to first set of requirements or to a second set of requirements.

According to some embodiments, a method in a network node comprises signaling, to the wireless device, one or more configuration parameters related to relative measurements to be performed on at least one cell on which LBT operations may be performed. The method further comprises receiving, from the wireless device a relative measurement adapted while accounting for the LBT operation.

According to some embodiments, the method comprises determining whether downlink listen-before-talk, LBT, operations performed on one or more cells impact at least one measurement component of a relative measurement performed by a wireless device and involving radio measurements of transmissions from the one or more cells; and determining the one or more configuration parameters related to the relative measurement, based on said determining.

According to some embodiments, the method comprises determining that downlink LBT operations performed on the one or more cells impact a measurement component of a relative measurement performed by the wireless device based on determining that one or more of the following apply: a carrier on which the measurement component is to be measured by the wireless device has a given frame structure; downlink LBT operations may be performed on at least one of the cells to be measured by the wireless device for the relative measurement; at least some discovery reference signals, DRSs, are detected as not present in a DRS occasion or in a series of DRS occasions of a predetermined length; another node indicates that downlink LBT operations may be performed on at least one of the cells to be measured by the wireless device for the relative measurement; and another node signals at least one parameter related to the wireless device's relative measurement for downlink LBT operations.

According to some embodiments, the one or more parameters comprise one or more of: a carrier frequency; a measurement type; a maximum measurement time; a minimum number of available samples; a maximum number of missed samples due to downlink LBT operations; a reporting periodicity; an event trigger threshold; and a relative measurement timer parameter.

According to some embodiments, the one or more parameters comprise a selected time and/or frequency resource for at least one measurement component of the relative measurement.

According to some embodiments, a wireless device is adapted to carry out a method according to any example.

According to some embodiments, a wireless device is configured to perform relative measurements involving radio measurements of transmissions from first and second cells. The wireless device comprises a processing circuit configured to: determine that listen-before-talk, LBT, operations may be performed by a network node for one or both of the first and second cells; and perform the relative measurement, wherein said performing is based on said determining.

According to some embodiments, the processing circuit is configured to adapt at least one parameter related to the relative measurement based on said determining, and perform the relative measurement based on said at least one parameter.

According to some embodiments, at least one parameter is a maximum measurement time.

According to some embodiments, the processing circuit is configured to one or more of: report the performed relative measurement to another node; perform a handover or other cell change; perform a positioning operation; and adapt a timing maintained by the wireless device.

According to some embodiments, the processing circuit is configured to determine that LBT operations performed by the network node for one or both of the first and second cells may affect a measurement component of a relative measurement by determining that a measurement component may be impacted based on one or more of: a carrier on which the measurement component is measured having a given frame structure;

information indicating that a measured cell may perform downlink LBT operations;

detecting that one or more discovery reference signals, DRSs, are detected as not present in a DRS occasion or in a series of DRS occasions over an interval having a predetermined length;

information received from another node that indicates that downlink LBT operations may be performed on the first and/or second cells;

information received from another node indicates that the wireless device should adapt the wireless device's relative measurement procedure; and information received from another node indicates at least one parameter related to relative measurement for downlink LBT operations.

According to some embodiments, the processing circuit is configured to perform the relative measurement by applying one or more parameters and/or conditions specific to relative measurements involving downlink LBT operations.

According to some embodiments, one or more of the following conditions apply to the relative measurement: signals to be measured for each measurement component can be missing no more than a predetermined number N times; signals to be measured for each measurement component can be missing no more than a predetermined number N times during a time interval having a length T1; at least M samples for each measurement component are not impacted by downlink LBT operations; at least M samples for each measurement component are not impacted by downlink LBT operations during a time interval having a length T2; samples of the two measurement components for the first and second cells are not separated in time by more than a predetermined time interval delta_t1; the two measurement components are not separated in time y more than a predetermined time interval delta_t2; no more than K time resources containing signals to be measured for each measurement component can be missing; and no more than K time resources containing signals to be measured for each measurement component can be missing during a time interval having length T3.

According to some embodiments, the processing circuit is configured to, if the one or more conditions are not met for an ongoing relative measurement, one of: discard the ongoing relative measurement; discard the ongoing relative measurement and restarting a relative measurement; continue the ongoing relative measurement with one or more relaxed requirements; and continue the ongoing relative measurement with an extended measurement time.

According to some embodiments, the processing circuit is configured to perform the relative measurement by one or more of: adapting a measurement sampling rate and/or a number of measurement samples for at least one measurement component; adapting a measurement time over which the wireless device obtains samples for at least one measurement component; adapting one or more of relative measurement procedures; adapting a combining of the two measurement components; partially discarding a relative measurement; and adapting a measurement time of the relative measurement to account for downlink LBT detection on one or both measurement components.

According to some embodiments, the processing circuit is configured to report the performed relative measurement to another node, and indicate whether the wireless device performed the relative measurement according to first set of requirements or to a second set of requirements.

According to some embodiments, a network node is adapted to carry out a method according to any example.

According to some embodiments, a network node comprises a processing circuit configured to: signal, to the wireless device, one or more configuration parameters related to relative measurements to be performed on at least one cell on which LBT operations may be performed; and receive, from the wireless device a relative measurement adapted while accounting for the LBT operation.

According to some embodiments, the processing circuit is configured to: determine whether downlink listen-before-talk, LBT, operations performed on one or more cells impact at least one measurement component of a relative measurement performed by a wireless device and involving radio measurements of transmissions from the one or more cells; and determine the one or more configuration parameters related to the relative measurement, based on said determining.

According to some embodiments, the processing circuit is configured to determine that downlink LBT operations performed on the one or more cells impact a measurement component of a relative measurement performed by the wireless device based on determining that one or more of the following apply: a carrier on which the measurement component is to be measured by the wireless device has a given frame structure; downlink LBT operations may be performed on at least one of the cells to be measured by the wireless device for the relative measurement; at least some discovery reference signals, DRSs, are detected as not present in a DRS occasion or in a series of DRS occasions of a predetermined length; another node indicates that downlink LBT operations may be performed on at least one of the cells to be measured by the wireless device for the relative measurement; and another node signals at least one parameter related to the wireless device's relative measurement for downlink LBT operations.

According to some embodiments, one or more parameters comprise one or more of: a carrier frequency; a measurement type; a maximum measurement time; a minimum number of available samples; a maximum number of missed samples due to downlink LBT operations; a reporting periodicity; an event trigger threshold; and a relative measurement timer parameter.

According to some embodiments, one or more parameters comprise a selected time and/or frequency resource for at least one measurement component of the relative measurement.

According to some embodiments, a non-transitory computer readable storage medium storing a computer program is for performing relative measurements involving radio measurements of transmissions from first and second cells. The computer program comprises program instructions that, when executed on a wireless device configured to operate in a wireless communication network, cause the processing circuit to: determine that listen-before-talk, LBT, operations may be performed by a network node for one or both of the first and second cells; and perform the relative measurement, wherein said performing is based on said determining.

According to some embodiments, a computer program comprises instructions which, when executed on at least one processing circuit, cause the at least one processing circuit to carry out the method according to any example.

According to some embodiments, a carrier contains the computer program of any example, wherein the carrier is one of an electronic signal, optical signal, radio signal, or computer readable storage medium.

According to some embodiments, a non-transitory computer readable storage medium stores a computer program comprising program instructions that, when executed on a network node configured to operate in a wireless communication network, cause the processing circuit to: signal, to the wireless device, one or more configuration parameters related to relative measurements to be performed on at least one cell on which LBT operations may be performed; and receive, from the wireless device a relative measurement adapted while accounting for the LBT operation.

According to some embodiments, a computer program, comprising instructions which, when executed on at least one processing circuit, cause the at least one processing circuit to carry out the method according to any example.

According to some embodiments, a carrier contains the computer program of any example wherein the carrier is one of an electronic signal, optical signal, radio signal, or computer readable storage medium.

According to some embodiments, a wireless device comprises a determining module for determining that listen-before-talk, LBT, operations may be performed by a network node for one or both of the first and second cells; and a performing module for performing the relative measurement, wherein said performing is based on said determining.

According to some embodiments, a network node comprises a signaling module for signaling the one or more configuration parameters to the wireless device, wherein the one or more configuration parameters is related to relative measurements to be performed on at least one cell on which LBT operations may be performed. The network node is configured to: receive, from the wireless device a relative measurement adapted while accounting for the LBT operation.

According to some embodiments, a method in a network node includes determining whether downlink LBT operations performed on one or more cells impact at least one measurement component of a relative measurement performed by a wireless device and involving radio measurements of transmissions from the one or more cells. The method also includes determining one or more configuration parameters related to the relative measurement, based on this determination, and signaling the one or more configuration parameters to the wireless device.

According to some embodiments, a wireless device configured to performing relative measurements involving radio measurements of transmissions from first and second cells includes a processing circuit configured to determine that LBT operations performed by a network node for one or both of the first and second cells may affect a measurement component of a relative measurement. The processing circuit is also configured to perform the relative measurement based on said determining.

According to some embodiments, a network node comprises a processing circuit configured to determine whether downlink LBT operations performed on one or more cells impact at least one measurement component of a relative measurement performed by a wireless device and involving radio measurements of transmissions from the one or more cells. The processing circuit is also configured to determine one or more configuration parameters related to the relative measurement, based on said determining, and signal the one or more configuration parameters to the wireless device.

The method may also be implemented by apparatus, devices, computer readable medium, computer program products and functional implementations.

Of course, the present invention is not limited to the above features and advantages. Those of ordinary skill in the art will recognize additional features and advantages upon reading the following detailed description, and upon viewing the accompanying drawings.

DETAILED DESCRIPTION

Various embodiments described herein relate to performing relative measurements while accounting for LBT. Accounting for LBT may involve a network node configuring parameters that a wireless device uses for performing relative measurements. For example, the network node may determine whether the downlink LBT impacts at least one measurement component of a relative measurement for a wireless device. Based on this determination, the network node configures at least one parameter related to the relative measurement for the wireless device and signals the at least one parameter to the wireless device.

For example, the impacted measurement component may be one of two RSRP measurements to be made to determine a relative RSRP or one of two RSRQ measurements to be made to determine a relative RSRQ. Each measurement component may be the same type of measurement but measured for different cells. The related parameter signaled to the wireless device may then be used by the wireless device to account for the LBT impact on the measurement component. This may involve configuring the wireless device to use, for the impacted relative measurement, a particular carrier frequency, measurement type, maximum measurement time, minimum number of available samples, etc.

Figure 2:
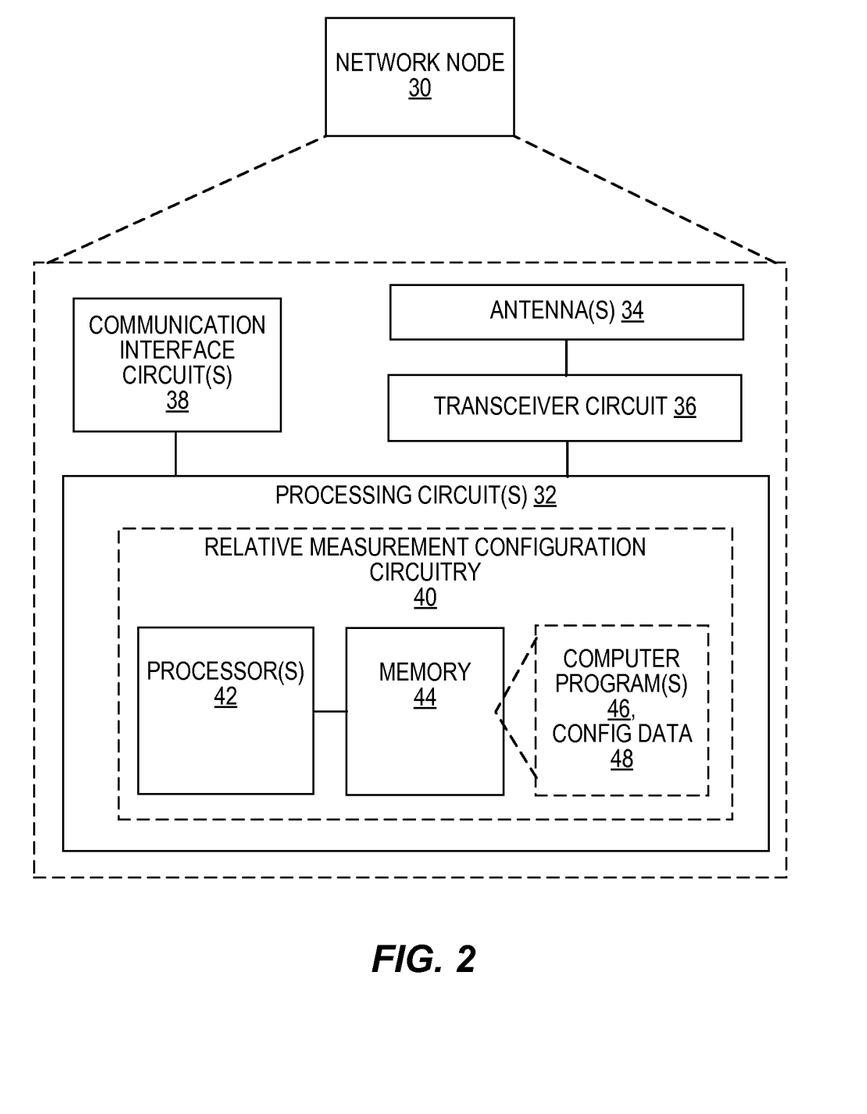
FIG. 2 is a block diagram of a network node configured to configure relative measurements, according to some embodiments.

Such a method may be implemented by a network access node, such as network node 30 illustrated in FIG. 2. The network node 30 facilitates communication between wireless devices and the core network. The generic terminology "network node" is used, but the network node 30 can be any kind of network node such as a radio network node such as base station, radio base station, base transceiver station, base station controller, network controller, evolved Node B (eNB), Node B, Multi-cell/multicast Coordination Entity (MCE), relay node, access point, radio access point, Remote Radio Unit (RRU) Remote Radio Head (RRH), a core network node (e.g., MME, SON node, a coordinating node, positioning node, MDT node, etc.), or even an external node (e.g., 3rd party node, a node external to the current network), etc. It may also include, in some cases, Operations Support System (OSS), Operations and Maintenance (O&M), Self-Organizing Network (SON), positioning node, Evolved Serving Mobile Location Center (E-SMLC), a centralized controller, a core network node, Mobility Management Entity (MME), base station controller, or network controller.

The network node 30 includes a communication interface circuit 38 that includes circuitry for communicating with other nodes in the core network, radio nodes, and/or other types of nodes in the network for the purposes of providing data and cellular communication services. The network node 30 communicates with wireless devices via antennas 34 and a transceiver circuit 36. The transceiver circuit 36 may include transmitter circuits, receiver circuits, and associated control circuits that are collectively configured to transmit and receive signals according to a radio access technology, for the purposes of providing cellular communication services. According to various embodiments, cellular communication services may be operated according to any one or more of the 3GPP cellular standards, global system for mobile (GSM), general packet radio service (GPRS), wideband code division multiple access (WCDMA), high-speed downlink packet access (HSDPA), long-term evolution (LTE) and LTE-Advanced.

The network node 30 also includes one or more processing circuits 32 that are operatively associated with the communication interface circuit 38 or transceiver circuit 36. The network node 30 uses the communication interface circuit 38 to communicate with network nodes and the transceiver 36 to communicate with wireless device. For ease of discussion, the one or more processing circuits 32 are referred to hereafter as "the processing circuit 32." The processing circuit 32 comprises one or more digital processors 42, e.g., one or more microprocessors, microcontrollers, Digital Signal Processors (DSPs), Field Programmable Gate Arrays (FPGAs), Complex Programmable Logic Devices (CPLDs), Application Specific Integrated Circuits (ASICs), or any mix thereof. More generally, the processing circuit 32 may comprise fixed circuitry, or programmable circuitry that is specially configured via the execution of program instructions implementing the functionality taught herein, or may comprise some mix of fixed and programmed circuitry. The processor 42 may be multi-core having two or more processor cores utilized for enhanced performance, reduced power consumption, and more efficient simultaneous processing of multiple tasks.

The processing circuit 32 also includes a memory 44. The memory 44, in some embodiments, stores one or more computer programs 46 and, optionally, configuration data 48. The memory 44 provides non-transitory storage for the computer program 46 and it may comprise one or more types of computer-readable media, such as disk storage, solid-state memory storage, or any mix thereof. By way of non-limiting example, the memory 44 comprises any one or more of SRAM, DRAM, EEPROM, and FLASH memory, which may be in the processing circuit 32 and/or separate from the processing circuit 32.

In general, the memory 44 comprises one or more types of computer-readable storage media providing non-transitory storage of the computer program 46 and any configuration data 48 used by the network node 30. Here, "non-transitory" means permanent, semi-permanent, or at least temporarily persistent storage and encompasses both long-term storage in non-volatile memory and storage in working memory, e.g., for program execution.

In some embodiments, the processor 42 of the processing circuit 32 may execute a computer program 46 stored in the memory 44 that configures the processor 42 to determine whether downlink LBT operations performed on one or more cells impact at least one measurement component of a relative measurement performed by a wireless device and involving radio measurements of transmissions from the one or more cells. The processing circuit 32 is also configured to determine one or more configuration parameters related to the relative measurement, based on said determining, and to signal the one or more configuration parameters to the wireless device. This functionality may be performed by relative measurement configuration circuitry 40 in processing circuit 32.

Figure 3:
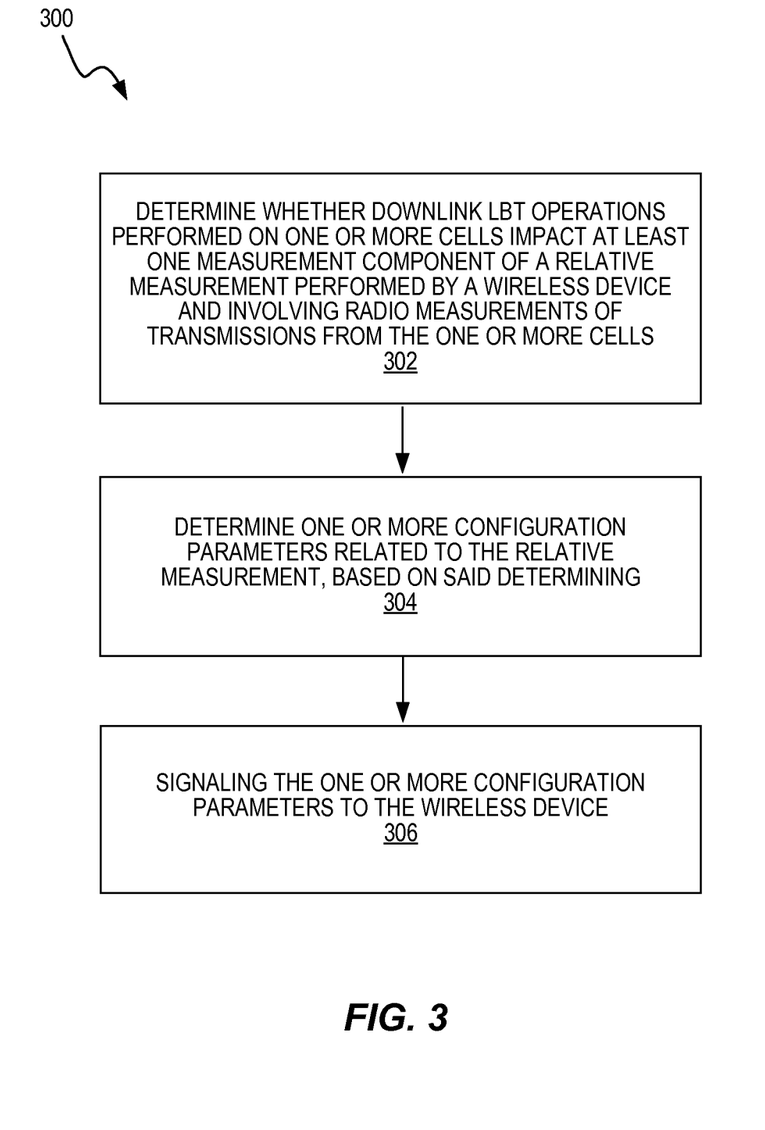
FIG. 3 illustrates a method in a network node for configuring relative measurements, according to some embodiments.

The processing circuit 32 of the network node 30 is also configured to perform a method, such as method 300 of FIG. 3. The method 300 includes determining whether downlink LBT operations performed on one or more cells impact at least one measurement component of a relative measurement performed by a wireless device and involving radio measurements of transmissions from the one or more cells (block 302). The method 300 also includes determining one or more configuration parameters related to the relative measurement, based on this determination (block 304), and signaling the one or more configuration parameters to the wireless device (block 306).

The method 300 may include determining that downlink LBT operations performed on the one or more cells impact a measurement component of a relative measurement performed by the wireless device based on determining that one or more of the following apply: a carrier (e.g., frequency) on which the measurement component is to be measured by the wireless device has a given frame structure (e.g., SF3); downlink LBT operations may be performed on at least one of the cells to be measured by the wireless device for the relative measurement (e.g., cell is LAA-capable); at least some DRSs are detected as not present in a DRS occasion or in a series of DRS occasions of a predetermined length; another node (e.g., eNodeB) indicates that downlink LBT operations may be performed on at least one of the cells to be measured by the wireless device for the relative measurement; and another node signals at least one parameter related to the wireless device's relative measurement for downlink LBT operations.

The parameters may include one or more of: a carrier frequency; a measurement type; a maximum measurement time; a minimum number of available samples; a maximum number of missed samples due to downlink LBT operations; relative measurement reporting configuration parameters (e.g., reporting periodicity); an event trigger threshold; and a relative measurement timer parameter. This may include configuration of an event trigger based on the relative measurement (e.g., a threshold) or configuring a timer in the network node 30 related to the relative measurement.

The network node 30 may also selectively configure a relative time measurement or a trigger based on a relative measurement, to minimize the impact of downlink LBT on the measurement. This may include selecting time and/or frequency resources for one or both measurement components, which are less subject to the downlink LBT impact. This may also include avoiding configuring relative measurements when the channel occupancy is above a threshold.

In some cases, the network node 30 determines the downlink LBT impact on at least one measurement component of a relative measurement for a wireless device. The downlink LBT may be performed by the network node 30 and/or another node whose radio signals are to be measured for the relative measurement. Note that downlink LBT may also be performed by one or two non-serving network nodes. The determination of the LBT impact may be based on one or more of: a pre-defined rule, downlink LBT detection, an implicit or explicit indication from another node, history, radio measurements, etc.

In some embodiments, the wireless device itself determines or receives information that LBT operations will affect at least one measurement component of a relative measurement. The wireless device then performs the relative measurement based on this determination. This may involve, for instance, applying a parameter or condition specific to relative measurements involving downlink LBT operations.

In an example at the wireless device, a method for performing a relative measurement includes determining that downlink LBT may impact the first measurement component of the relative measurement and/or the second measurement component of the relative measurement. The method includes performing the relative measurement comprising the first and the second measurement component adaptively, while accounting for the downlink LBT, and reporting the performed relative measurement to another node and/or using the relative measurement for one or more wireless device operational tasks.

Figure 4:
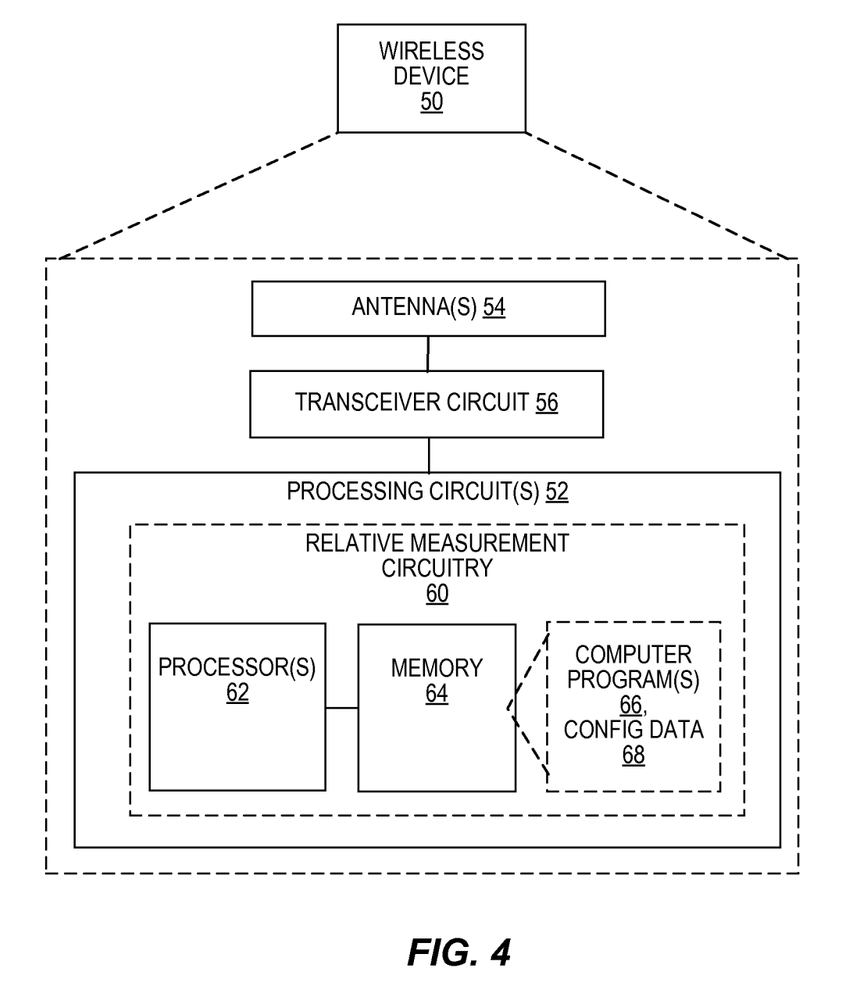
FIG. 4 is a block diagram of a wireless device configured to perform relative measurements, according to some embodiments.

FIG. 4 illustrates a diagram of a wireless device 50, such as a UE, that performs such device-side techniques, according to some embodiments. To ease explanation, the wireless device 50 may also be considered to represent any wireless device that may utilize CA or LAA in a network. The wireless device 50 may be a radio communication device, target device (device targeted for communication), device to device (D2D) UE, machine type UE or UE capable of machine to machine communication (M2M), a sensor equipped with UE, iPAD, Tablet, mobile terminals, smart phone, laptop embedded equipped (LEE), laptop mounted equipment (LME), USB dongles, Customer Premises Equipment (CPE) etc.

The wireless device 50 communicates with a radio node or base station, such as network node 30, via antennas 54 and a transceiver circuit 56. The transceiver circuit 56 may include transmitter circuits, receiver circuits, and associated control circuits that are collectively configured to transmit and receive signals according to a radio access technology, for the purposes of providing cellular communication services. According to various embodiments, cellular communication services may be operated according to any one or more of the 3GPP cellular standards, GSM, GPRS, WCDMA, HSDPA, LTE and LTE-Advanced.

The wireless device 50 also includes one or more processing circuits 52 that are operatively associated with the radio transceiver circuit 56. The processing circuit 52 comprises one or more digital processing circuits, e.g., one or more microprocessors, microcontrollers, DSPs, FPGAs, CPLDs, ASICs, or any mix thereof. More generally, the processing circuit 52 may comprise fixed circuitry, or programmable circuitry that is specially adapted via the execution of program instructions implementing the functionality taught herein, or may comprise some mix of fixed and programmed circuitry. The processing circuit 52 may be multi-core.

The processing circuit 52 also includes a memory 64. The memory 64, in some embodiments, stores one or more computer programs 66 and, optionally, configuration data 68. The memory 64 provides non-transitory storage for the computer program 66 and it may comprise one or more types of computer-readable media, such as disk storage, solid-state memory storage, or any mix thereof. By way of non-limiting example, the memory 64 comprises any one or more of SRAM, DRAM, EEPROM, and FLASH memory, which may be in the processing circuit 52 and/or separate from processing circuit 52. In general, the memory 64 comprises one or more types of computer-readable storage media providing non-transitory storage of the computer program 66 and any configuration data 68 used by the wireless device 50.

In some embodiments, the processor 62 of the processing circuit 52 may execute a computer program 66 stored in the memory 64 that configures the processor 62 of a wireless device, such as wireless device 50, to perform a method for performing relative measurements involving radio measurements of transmissions from first and second cells. Specifically, the processing circuit 32 is configured to determine that LBT operations performed by a network node, such as network node 30, for one or both of the first and second cells may affect a measurement component of a relative measurement and perform the relative measurement based on the determining. This functionality and other described functions may be performed by relative measurement circuitry 60 in processing circuit 52.

Figure 5:
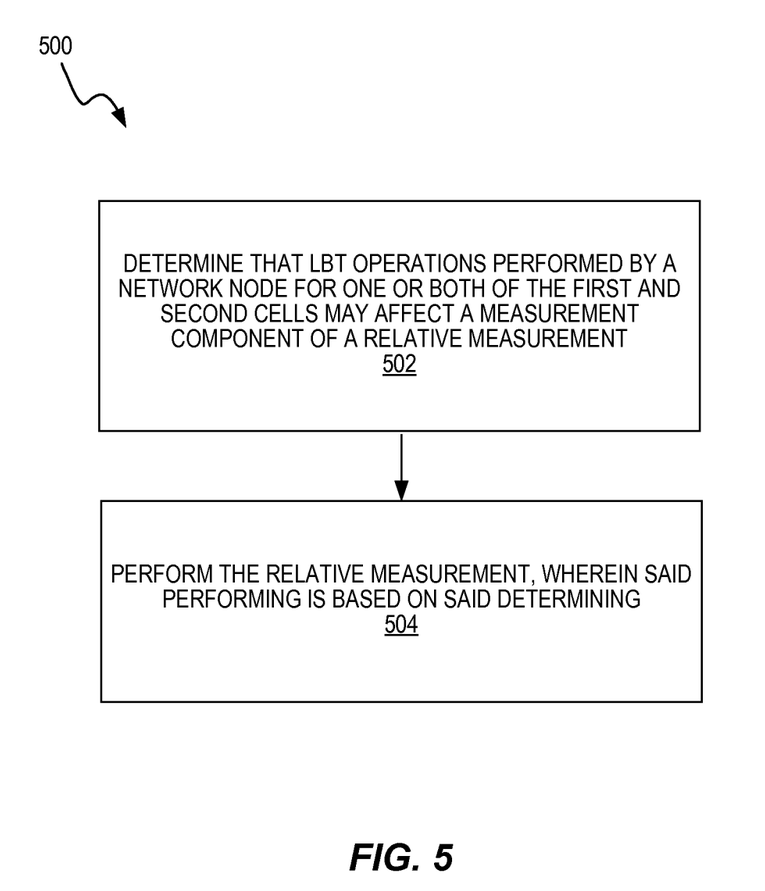
FIG. 5 illustrates a method in a wireless device for performing relative measurements, according to some embodiments.

According to some embodiments, the processing circuit 52 of the wireless device 50 is also configured to perform a method 500 for performing relative measurements involving radio measurements of transmissions from first and second cells. The method 500 includes determining that LBT operations performed by a network node for one or both of the first and second cells may affect a measurement component of a relative measurement (block 502). The downlink LBT may impact the first measurement component of the relative measurement and/or the second measurement component of the relative measurement. The method 500 may then include performing the relative measurement, wherein said performing is based on said determining (block 504). For example, the relative measurement comprising the first and the second measurement component may be performed adaptively, while accounting for the downlink LBT.

The relative measurement may be used for one or more wireless device operational tasks. The method 500 may also include one or more of: reporting the performed relative measurement to another node; performing a handover or other cell change; performing a positioning operation; and adapting a timing maintained by the wireless device. Other tasks may involve supporting wireless device mobility, adapting timing or acquiring synchronization.

In some embodiments, determining that LBT operations performed by the network node for one or both of the first and second cells may affect a measurement component of a relative measurement includes determining that a measurement component may be impacted based on one or more of: a carrier on which the measurement component is measured having a given frame structure; information indicating that a measured cell may perform downlink LBT operations; and detecting that one or more discovery reference signals (DRSs) are detected as not present in a DRS occasion or in a series of DRS occasions over an interval having a predetermined length.

In one example where at least some DRS signals are detected as not present in the DRS occasion (missing due to downlink LBT), if the wireless device is unavailable to receive certain signals (e.g., DRS, broadcast signals, etc.) over a certain time window (e.g., T0 such as T0 number of subframes), then the wireless device may assume that the second node is unable to transmit those signals on a cell of a carrier due to LBT failure. That is, the channel on that carrier is occupied. In another example, if the wireless device is unavailable to receive any signal over T0 subframes, then the wireless device may assume that the second node is unable to transmit those signals on a cell of a carrier due to LBT failure.

In some embodiments, determining that LBT operations performed by the network node for one or both of the first and second cells may affect a measurement component of a relative measurement includes determining that a measurement component may be impacted based on one or more of: information received from another node that indicates that downlink LBT operations may be performed on the first and/or second cells; information received from another node indicates that the wireless device should adapt the wireless device's relative measurement procedure; and information received from another node indicates at least one parameter related to relative measurement for downlink LBT operations.

In other cases, the determining may be based on one or more of: a pre-defined rule, downlink LBT detection, implicit or explicit indication from another node, history, radio measurements, etc. The wireless device may determine that a measurement component (the first or the second or both) may be impacted by the downlink LBT if, for example, one or more situations apply. Such situations may include that the carrier frequency where the measurement component is measured has a specific frame structure (e.g., SF3) or that the cell measured is LAA-capable and may perform downlink LBT.

Performing the relative measurement may include applying one or more parameters and/or conditions specific to relative measurements involving downlink LBT operations. For example, the wireless device may be required to meet one or more requirements for the relative measurement, such as accuracy requirements, measurement time requirements, a number of cells on which the measurement is to be performed, a reporting delay, signal quality and/or signal strength down to which the requirements are to be met. The requirements may apply under specific conditions.

The specific conditions that may apply to the relative measurement include, for example, one or more of: signals to be measured for each measurement component can be missing (e.g., due to downlink LBT) no more than a predetermined number N times; signals to be measured for each measurement component can be missing no more than a predetermined number N times during a time interval having a length T1; at least M samples for each measurement component are not impacted by downlink LBT operations; at least M samples for each measurement component are not impacted by downlink LBT operations during a time interval having a length T2; samples of the two measurement components for the first and second cells are not separated in time by more than a predetermined time interval delta_t1; the two measurement components are not separated in time by more than a predetermined time interval delta_t2; no more than K time resources containing signals to be measured for each measurement component can be missing; and no more than K time resources containing signals to be measured for each measurement component can be missing during a time interval having length T3.

If the conditions are not met for an ongoing relative measurement, the method 500 may include, in some embodiments, one of: discarding the ongoing relative measurement; discarding the ongoing relative measurement and restarting a relative measurement; continuing the ongoing relative measurement with one or more relaxed requirements; and continuing the ongoing relative measurement with an extended measurement time.

Examples of relaxed requirements include an extended measurement time (e.g., from 200 ms to 400 ms) or performing the relative measurement with relaxed accuracy (e.g., performing RSRP within ±3 dB accuracy instead of ±2 dB). The wireless device may continue performing the measurement, but in this case, the wireless device is allowed to extend the measurement time with respect to a reference time (e.g., extended L1 measurement period, extend cell identification time, etc.).

Performing the relative measurement adaptively, while accounting for the downlink LBT, may further comprise, for example, performing the relative measurement so that one, some or all of the above requirements and/or conditions are met.

In some embodiments, performing the relative measurement includes one or more of: adapting a measurement sampling rate and/or a number of measurement samples for at least one measurement component; adapting a measurement time over which the wireless device obtains samples for at least one measurement component; adapting one or more of relative measurement procedures; adapting a combining of the two measurement components; partially discarding a relative measurement; and adapting a measurement time of the relative measurement to account for downlink LBT detection on one or both measurement components.

Partially discarding the measurements may include, for example, performing absolute measurement on one of the cells where a certain minimum number of signals and/or time resources for measurements are available during measurement time at the wireless device. The measurement time of the relative measurement may be adapted to account for downlink LBT detection on one or both measurement components. For example, the measurement time may be extended to account for the fact that the wireless device may need to perform downlink LBT detection before sampling. In the worst case, the downlink LBT detection may need to be performed before each sampling for each measurement component.

The method 500 may include, in some embodiments, reporting the performed relative measurement to another node (e.g., to an eNodeB or another wireless device). Some other examples of the wireless device operational tasks may include measurement logging for MDT, RRM, cell change or handover, cell selection, positioning, etc.

The reporting of the relative measurement may further comprise an indication whether the wireless device has accounted for downlink LBT while performing the relative measurement. In another example, the reporting may comprise reporting the relative measurement error due to downlink LBT, such as when the signals for at least one measurement component have not been available for too long. The reporting of the relative measurement may further comprise an indication whether the wireless device has performed the relative measurement according to a first set of requirements or a second set (e.g., relaxed) of requirements. The first set of requirements is met when the wireless device is able to receive a certain minimum number of signals over a measurement time. The second set of requirements is met when the wireless device is not able to receive certain minimum number of signals over a measurement time (e.g., due to downlink LBT).

Advantages of the embodiments disclosed herein include the ability to correctly perform relative measurements in the presence of LBT. Another advantage includes reporting relative measurements by the wireless device in a non-ambiguous way in the presence of LBT.

Figure 6:
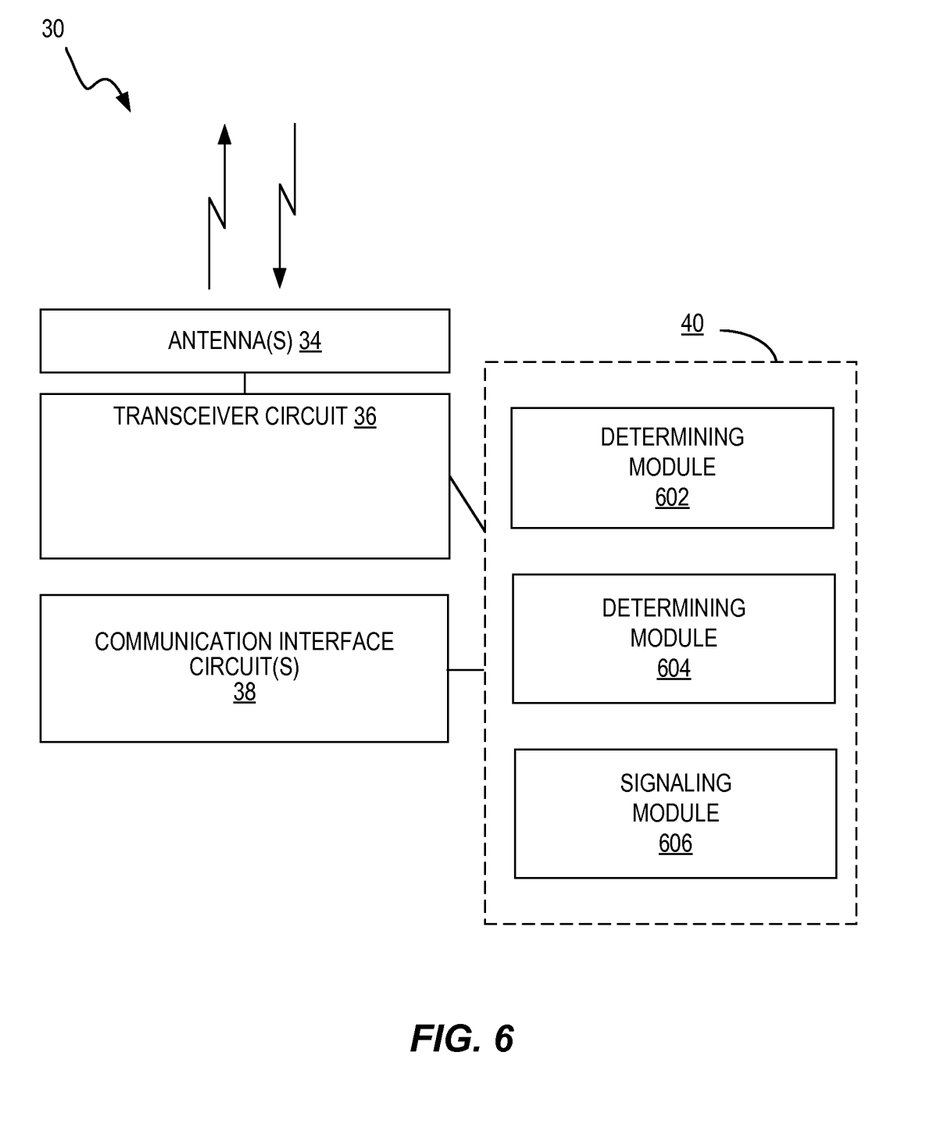
FIG. 6 is a block diagram illustrating a functional implementation of a network node configured to configure relative measurement performance, according to some embodiments.

FIG. 6 illustrates an example functional module or circuit architecture as may be implemented in the network node 30, e.g., based on the relative measurement configuration circuitry 40. The illustrated embodiment at least functionally includes a determining module 602 for determining whether downlink LBT operations performed on one or more cells impact at least one measurement component of a relative measurement performed by a wireless device and involving radio measurements of transmissions from the one or more cells and a determining module 604 for determining one or more configuration parameters related to the relative measurement, based on said determining. The implementation also includes a signaling module 606 for signaling the one or more configuration parameters to the wireless device.

Figure 7:
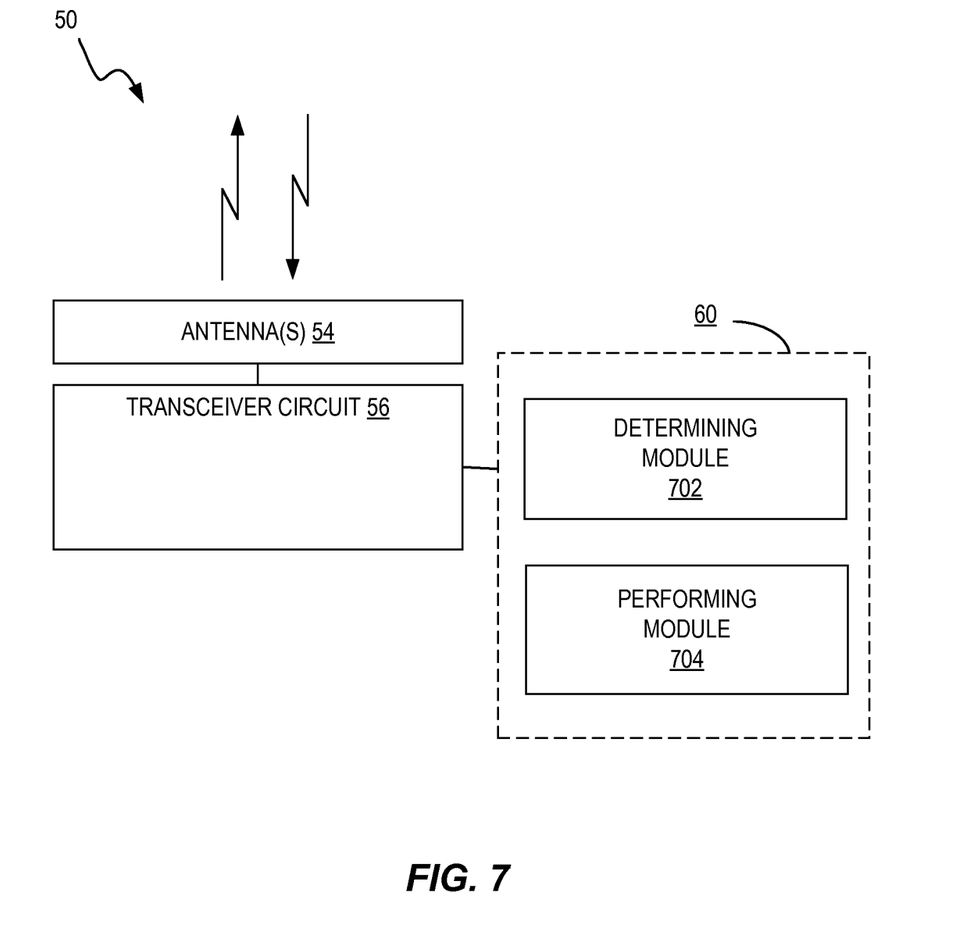
FIG. 7 is a block diagram illustrating a functional implementation of a wireless device configured to perform relative measurements, according to some embodiments.

FIG. 7 illustrates an example functional module or circuit architecture as may be implemented in the wireless device 50, e.g., based on the relative measurement circuitry 60. The illustrated embodiment at least functionally includes a determining module 702 for determining that LBT operations performed by a network node for one or both of the first and second cells may affect a measurement component of a relative measurement and a performing module 704 for performing the relative measurement, where said performing is based on said determining.

The term "signaling" used herein may comprise any of: high-layer signaling (e.g., via RRC), lower-layer signaling (e.g., via a physical control channel or a broadcast channel), or a combination thereof. The signaling may be implicit or explicit. The signaling may further be unicast, multicast or broadcast. The signaling may also be directly to another node or via a third node.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method in a wireless device for performing a relative measurement involving radio measurements of transmissions from first and second cells, the method comprising:
   determining that listen-before-talk (LBT) operations may be performed by a network node for one or both of the first and second cells; and
   performing the relative measurement, based on said determining, wherein said relative measurement is a radio measurement using first and second measurement components corresponding to the first and second cells, respectively.

2. The method of claim 1, wherein the method further comprises adapting at least one parameter related to the relative measurement based on said determining, and
   the performing the relative measurement is based on the adapted at least one parameter.

3. The method of claim 2 wherein the at least one parameter is a maximum measurement time.

4. The method of claim 1, wherein the method further comprises one or more of:
   reporting the performed relative measurement to another node;
   performing a handover or other cell change;
   performing a positioning operation; and
   adapting a timing maintained by the wireless device.

5. The method of claim 1, wherein said determining that LBT operations performed by the network node for one or both of the first and second cells may affect a measurement component of a relative measurement comprises determining that a measurement component may be impacted based on one or more of:
   a carrier on which the measurement component is measured having a given frame structure;
   information indicating that a measured cell may perform downlink LBT operations;
   detecting that one or more discovery reference signals (DRSs) are detected as not present in a DRS occasion or in a series of DRS occasions over an interval having a predetermined length;
   information received from another node that indicates that downlink LBT operations may be performed on the first and/or second cells;
   information received from another node indicates that the wireless device (50) should adapt the wireless device's relative measurement procedure; and
   information received from another node indicates at least one parameter related to relative measurement for downlink LBT operations.

6. The method of claim 1, wherein performing the relative measurement comprises applying one or more parameters and/or conditions specific to relative measurements involving downlink LBT operations.

7. The method of claim 6, wherein one or more of the following conditions apply to the relative measurement:
   signals to be measured for each measurement component can be missing no more than a predetermined number N times;
   signals to be measured for each measurement component can be missing no more than a predetermined number N times during a time interval having a length T1;
   at least M samples for each measurement component are not impacted by downlink LBT operations;
   at least M samples for each measurement component are not impacted by downlink LBT operations during a time interval having a length T2;

samples of the two measurement components for the first and second cells are not separated in time by more than a predetermined time interval delta_t1;

the two measurement components are not separated in time y more than a predetermined time interval delta_t2;

no more than K time resources containing signals to be measured for each measurement component can be missing; and no more than K time resources containing signals to be measured for each measurement component can be missing during a time interval having length T3.

8. The method of claim 6, wherein if the one or more conditions are not met for an ongoing relative measurement, the method comprises one of:

discarding the ongoing relative measurement;

discarding the ongoing relative measurement and restarting a relative measurement;

continuing the ongoing relative measurement with one or more relaxed requirements; and continuing the ongoing relative measurement with an extended measurement time.

9. The method of claim 1, wherein performing the relative measurement comprises one or more of:

adapting a measurement sampling rate and/or a number of measurement samples for at least one measurement component;

adapting a measurement time over which the wireless device obtains samples for at least one measurement component;

adapting one or more of relative measurement procedures;

adapting a combining of the two measurement components;

partially discarding a relative measurement; and adapting a measurement time of the relative measurement to account for downlink LBT detection on one or both measurement components.

10. The method of claim 1, wherein the method further comprises reporting the performed relative measurement to another node, and wherein said reporting comprises indicating whether the wireless device performed the relative measurement according to first set of requirements or to a second set of requirements.

11. A method in a network node, the method comprising:

signaling, to the wireless device, one or more configuration parameters related to relative measurements to be performed on at least one cell on which LBT operations may be performed; and receiving, from the wireless device, a relative measurement adapted while accounting for an LBT operation on at least one cell, wherein said relative measurement is a radio measurement using first and second measurement components corresponding to first and second cells, respectively.

12. The method as claimed in claim 11, the method comprising:

determining whether downlink listen-before-talk (LBT) operations performed on one or more cells impact at least one measurement component of a relative measurement performed by a wireless device and involving radio measurements of transmissions from the one or more cells;

determining the one or more configuration parameters related to the relative measurement, based on said determining.

13. The method of claim 11, wherein the method comprises determining that downlink LBT operations performed on the one or more cells impact a measurement component of a relative measurement performed by the wireless device based on determining that one or more of the following apply:

a carrier on which the measurement component is to be measured by the wireless device has a given frame structure;

downlink LBT operations may be performed on at least one of the cells to be measured by the wireless device for the relative measurement;

at least some discovery reference signals (DRSs) are detected as not present in a DRS occasion or in a series of DRS occasions of a predetermined length;

another node indicates that downlink LBT operations may be performed on at least one of the cells to be measured by the wireless device for the relative measurement; and another node signals at least one parameter related to the wireless device's relative measurement for downlink LBT operations.

14. The method of claim 11, wherein the one or more configuration parameters comprise one or more of:

a carrier frequency;

a measurement type;

a maximum measurement time;

a minimum number of available samples;

a maximum number of missed samples due to downlink LBT operations;

a reporting periodicity;

an event trigger threshold; and a relative measurement timer parameter.

15. The method of claim 11, wherein the one or more configuration parameters comprise a selected time and/or frequency resource for at least one measurement component of the relative measurement.

16. A wireless device configured to perform a relative measurement involving radio measurements of transmissions from first and second cells, the wireless device comprising a processing circuit configured to:

determine that listen-before-talk (LBT) operations may be performed by a network node for one or both of the first and second cells; and perform the relative measurement, based on said determining, wherein said relative measurement is a radio measurement using first and second measurement components corresponding to the first and second cells, respectively.

17. The wireless device of claim 16, wherein the processing circuit is configured to:

adapt at least one parameter related to the relative measurement based on said determining, and perform the relative measurement based on the adapted at least one parameter.

18. The wireless device of claim 16, wherein the processing circuit is configured to one or more of:

report the performed relative measurement to another node;

perform a handover or other cell change;

perform a positioning operation; and adapt a timing maintained by the wireless device.

19. The wireless device of claim 16, wherein the processing circuit is configured to determine that LBT operations performed by the network node for one or both of the first and second cells may affect a measurement component of a relative measurement by determining that a measurement component may be impacted based on one or more of:

a carrier on which the measurement component is measured having a given frame structure;
information indicating that a measured cell may perform downlink LBT operations;
detecting that one or more discovery reference signals (DRSs) are detected as not present in a DRS occasion or in a series of DRS occasions over an interval having a predetermined length;
information received from another node that indicates that downlink LBT operations may be performed on the first and/or second cells;
information received from another node indicates that the wireless device should adapt the wireless device's relative measurement procedure; and
information received from another node indicates at least one parameter related to relative measurement for downlink LBT operations.

20. The wireless device of claim 16, wherein one or more of the following conditions apply to the relative measurement:
signals to be measured for each measurement component can be missing no more than a predetermined number N times;
signals to be measured for each measurement component can be missing no more than a predetermined number N times during a time interval having a length T1;
at least M samples for each measurement component are not impacted by downlink LBT operations;
at least M samples for each measurement component are not impacted by downlink LBT operations during a time interval having a length T2;
samples of the two measurement components for the first and second cells are not separated in time by more than a predetermined time interval delta_t1;
the two measurement components are not separated in time y more than a predetermined time interval delta_t2;
no more than K time resources containing signals to be measured for each measurement component can be missing; and
no more than K time resources containing signals to be measured for each measurement component can be missing during a time interval having length T3.

21. The wireless device of claim 16, wherein the processing circuit is configured to, if the one or more conditions are not met for an ongoing relative measurement, one of:
discard the ongoing relative measurement;
discard the ongoing relative measurement and restarting a relative measurement;
continue the ongoing relative measurement with one or more relaxed requirements; and
continue the ongoing relative measurement with an extended measurement time.

22. The wireless device of claim 16, wherein the processing circuit is configured to perform the relative measurement by one or more of:
adapting a measurement sampling rate and/or a number of measurement samples for at least one measurement component;
adapting a measurement time over which the wireless device obtains samples for at least one measurement component;
adapting one or more of relative measurement procedures;
adapting a combining of the two measurement components;
partially discarding a relative measurement; and
adapting a measurement time of the relative measurement to account for downlink LBT detection on one or both measurement components.

23. A network node comprising a processing circuit configured to:
signal, to the wireless device, one or more configuration parameters related to relative measurements to be performed on at least one cell on which LBT operations may be performed; and
receive, from the wireless device, a relative measurement adapted while accounting for the LBT operation, wherein said relative measurement is a radio measurement using first and second measurement components corresponding to the first and second cells, respectively.

24. The network node of claim 23, wherein the processing circuit is configured to:
determine whether downlink listen-before-talk (LBT) operations performed on one or more cells impact at least one measurement component of a relative measurement performed by a wireless device and involving radio measurements of transmissions from the one or more cells; and
determine the one or more configuration parameters related to the relative measurement, based on said determining.

25. The network node of claim 23, wherein the processing circuit is configured to determine that downlink LBT operations performed on the one or more cells impact a measurement component of a relative measurement performed by the wireless device based on determining that one or more of the following apply:
a carrier on which the measurement component is to be measured by the wireless device has a given frame structure;
downlink LBT operations may be performed on at least one of the cells to be measured by the wireless device for the relative measurement;
at least some discovery reference signals (DRSs) are detected as not present in a DRS occasion or in a series of DRS occasions of a predetermined length;
another node indicates that downlink LBT operations may be performed on at least one of the cells to be measured by the wireless device for the relative measurement; and
another node signals at least one parameter related to the wireless device's relative measurement for downlink LBT operations.

26. The network node of claim 23, wherein the one or more configuration parameters comprise one or more of:
a carrier frequency;
a measurement type;
a maximum measurement time;
a minimum number of available samples;
a maximum number of missed samples due to downlink LBT operations;
a reporting periodicity;
an event trigger threshold; and
a relative measurement timer parameter.

* * * * *